United States Patent [19]

McCormick

[11] Patent Number: 5,839,557
[45] Date of Patent: Nov. 24, 1998

[54] ANNULAR CROSS-SECTIONED CLUTCH ASSEMBLY FOR CONNECTING A TOOL TO A ROBOTIC ARM

[75] Inventor: Peter E. McCormick, Dallas, Tex.

[73] Assignee: EOA Systems, Inc., Dallas, Tex.

[21] Appl. No.: 761,208

[22] Filed: Dec. 6, 1996

[51] Int. Cl.$^6$ ....................................................... F16D 7/02
[52] U.S. Cl. .......................................... 192/56.32; 901/49
[58] Field of Search .............................. 192/56.3, 56.31, 192/56.32, 56.33; 901/29, 49

[56] References Cited

U.S. PATENT DOCUMENTS

| 4,717,003 | 1/1988  | McCormick et al. | 192/56.32 |
| 4,842,114 | 6/1989  | Hepp             | 192/150 X |
| 4,884,670 | 12/1989 | McCormick et al. | 192/150   |
| 4,952,117 | 8/1990  | Nerger           | 901/49 X  |
| 4,998,606 | 3/1991  | McCormick et al. | 192/56.32 |
| 5,002,173 | 3/1991  | Hucul et al.     | 192/150   |
| 5,086,901 | 2/1992  | Petronis et al.  | 192/150   |

Primary Examiner—Charles A. Marmor
Assistant Examiner—Saúl Rodríquez
Attorney, Agent, or Firm—Daniel V. Thompson

[57] ABSTRACT

An annular cross-sectioned clutch assembly for connecting a tool such as a paint gun to the end of a robotic arm is provided. A diaphragm-mounting plate connects on an outer side to the end of the robotic arm. An annular diaphragm is mounted to the diaphragm-mounting plate. The diaphragm has an inner surface, with the inner surface forming a pressure tight chamber with the diaphragm-mounting plate for connection to a programable source of air pressure. A clutch plate has an annular diaphragm-engagement surface engaged with a central portion of the diaphragm. Springs between the clutch plate and the diaphragm-mounting plate bias the clutch plate away from the diaphragm-mounting plate in conjunction with air pressure in the chamber. Structure is provided to establish a normal position of the clutch assembly. Additional structure is provided to establish physical limits of travel of the clutch plate with respect to the diaphragm-mounting plate. Electrical devices generate an electrical signal in response to movement of the clutch plate away from the normal position.

3 Claims, 4 Drawing Sheets

ANNULAR CROSS-SECTIONED CLUTCH ASSEMBLY FOR CONNECTING A TOOL TO A ROBOTIC ARM

TECHNICAL FIELD

This invention relates to robotic tooling, and more particularly to an overload sensitive clutch for connecting a tool such as a paint gun to the end of a robot arm.

BACKGROUND OF THE INVENTION

There are numerous breakaway clutches for a robot end-of-arm tooling available, such as the McCormick, et al. U.S. Pat. Nos. 4,717,003 and 4,998,606, that are constructed without any internal passageways. While these prior clutches have been successful for most purposes, a substantial drawback involves the use of a breakaway clutch for a tool such as a paint gun that requires substantial hoses and other connective conduits passing between the robot and the tool. For a tool such as a paint gun, for example, a breakaway clutch with a large central opening would be desirable.

The McCormick, et al. U.S. Pat. No. 4,884,670 discloses a breakaway clutch ("variable compliance device") having a central opening, however, such device is relatively complex and expensive to manufacture and has a relatively wide profile.

Thus, there presently exists a need for a breakaway clutch having a large central opening that is relatively compact, simple and inexpensive to manufacture.

SUMMARY OF THE INVENTION

The present invention provides an annular cross-sectioned breakaway clutch for a tool such as a paint gun that includes means for establishing a normal position of the clutch assembly as well as means for forming physical limits of travel of the clutch elements. An annular diaphragm is provided for connection to a programmable source of air pressure.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
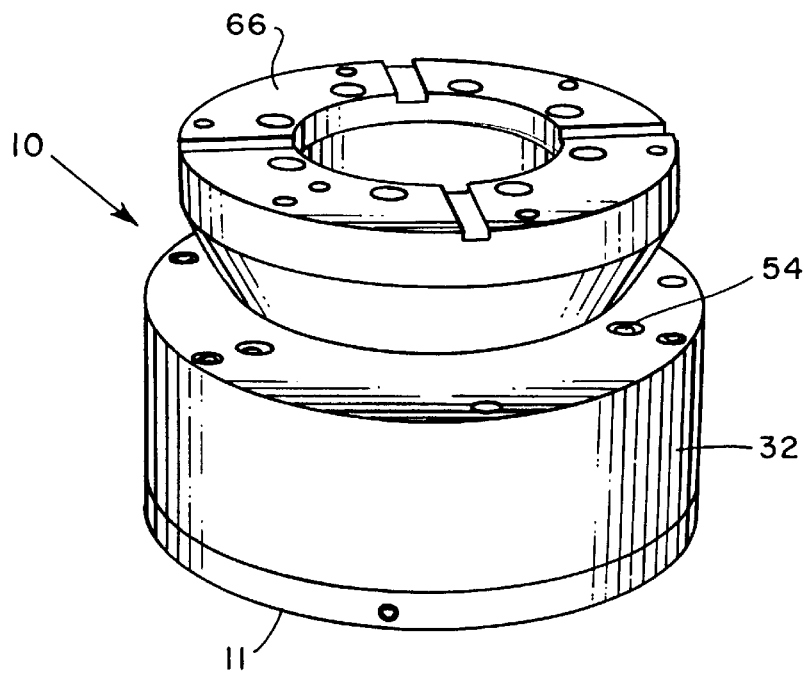
FIG. 1 is a perspective view of a annular cross-sectioned clutch assembly constructed in accordance with the invention.
Figure 2:
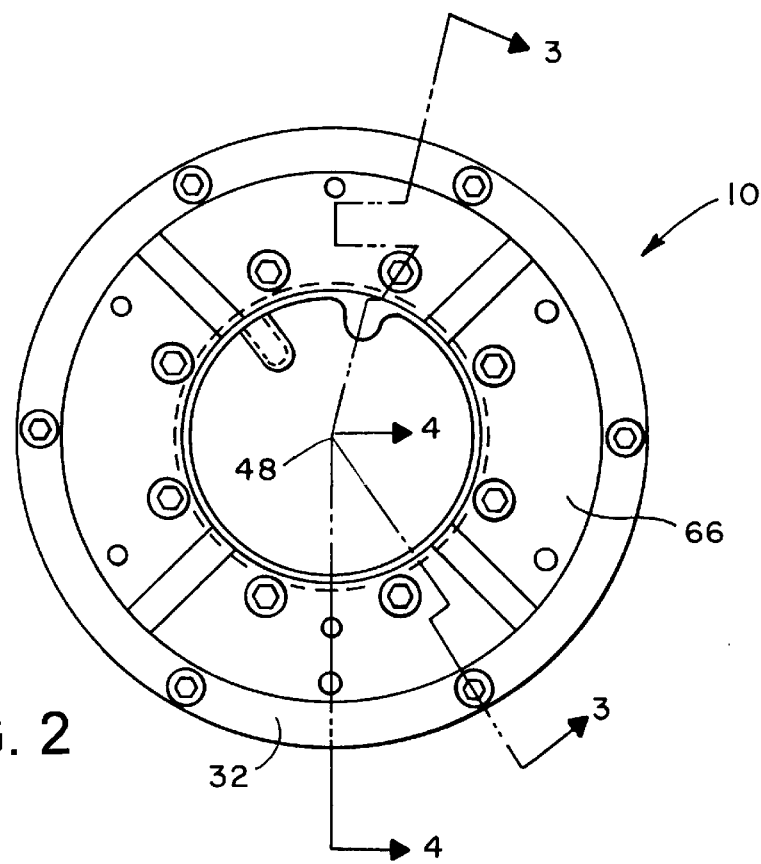
FIG. 2 is an end view of the clutch assembly of FIG. 1.
Figure 3:
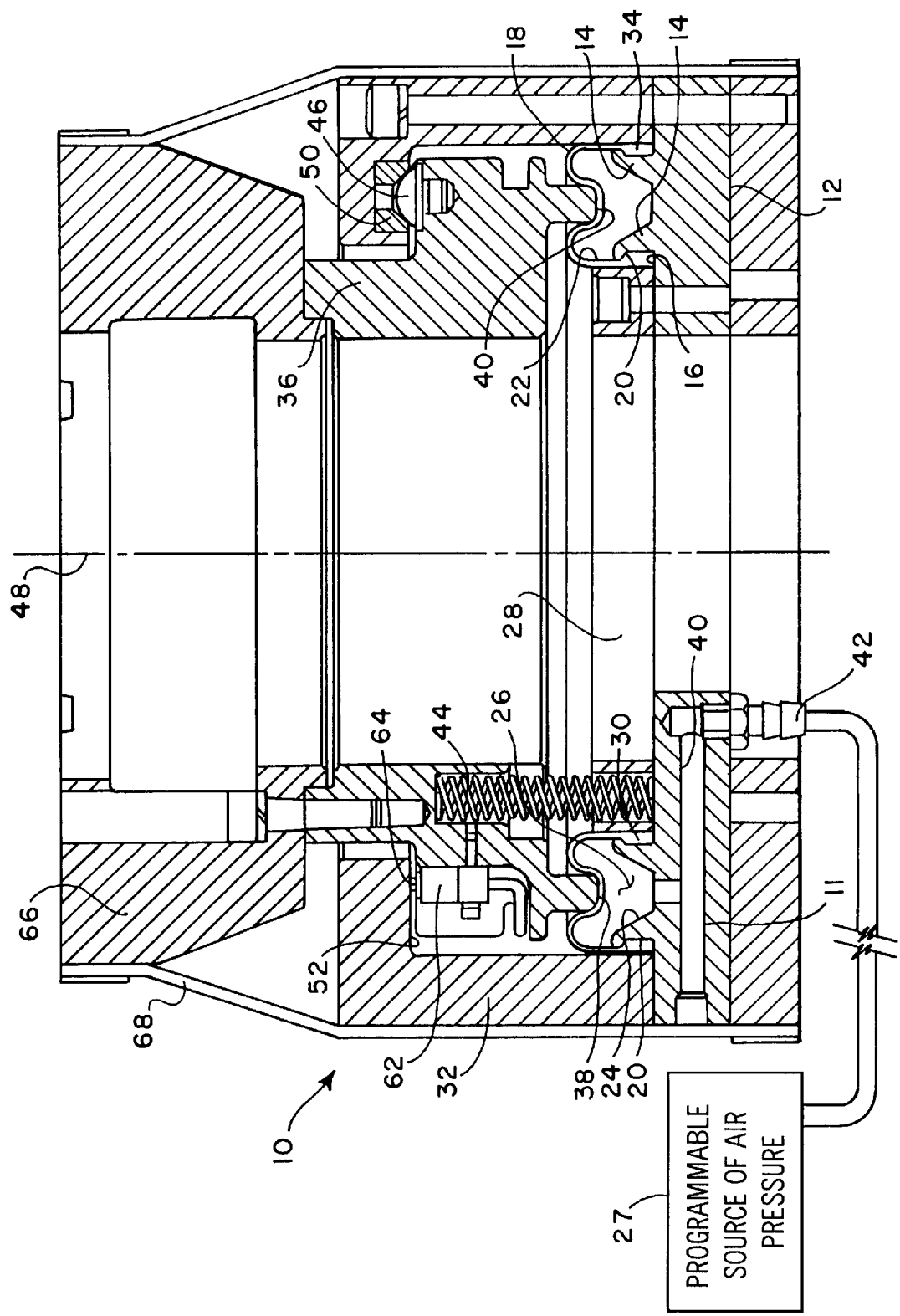
FIG. 3 is a sectional view taken along lines 3—3 of FIG. 2.

Referring to FIGS. 1–5, where like numerals indicate like and corresponding elements, a clutch assembly 10 is specially adapted to connect a paint gun (not shown) to the end of a robotic arm (not shown). Clutch assembly 10 includes a diaphragm-mounting plate 11 adapted to be connected to the end of a robotic arm on an outer side 12. Diaphragm-mounting plate 11 has an inwardly-extending set of diaphragm-mounting walls 14 on an inner side 16.

An annular diaphragm 18 is mounted over outer portion 20 of the diaphragm-mounting walls 14. The diaphragm 18 has an inner surface 22 which, with inner portion 24 of the diaphragm-mounting walls 14, forms a pressure tight chamber 26 for connection to a programmable source of air pressure (not shown).

An inner clamp ring 28 fixes an inner portion 30 of the diaphragm 18 to the diaphragm-mounting walls 14. Similarly, an outer clamp ring 32 fixes an outer portion 34 of the diaphragm 18 to the diaphragm-mounting walls 14.

A clutch plate 36 has an annular diaphragm-engagement surface 38 engaged with a central portion 40 of the diaphragm 18. Conduit 40 connects a fitting 42 with chamber 26.

A plurality of springs 44 are provided between the clutch plate 36 and the diaphragm-mounting plate 11 to bias the clutch plate 36 away from the diaphragm-mounting plate 11 in conjunction with air pressure in chamber 26 supplied to fitting 42.

Figure 4:
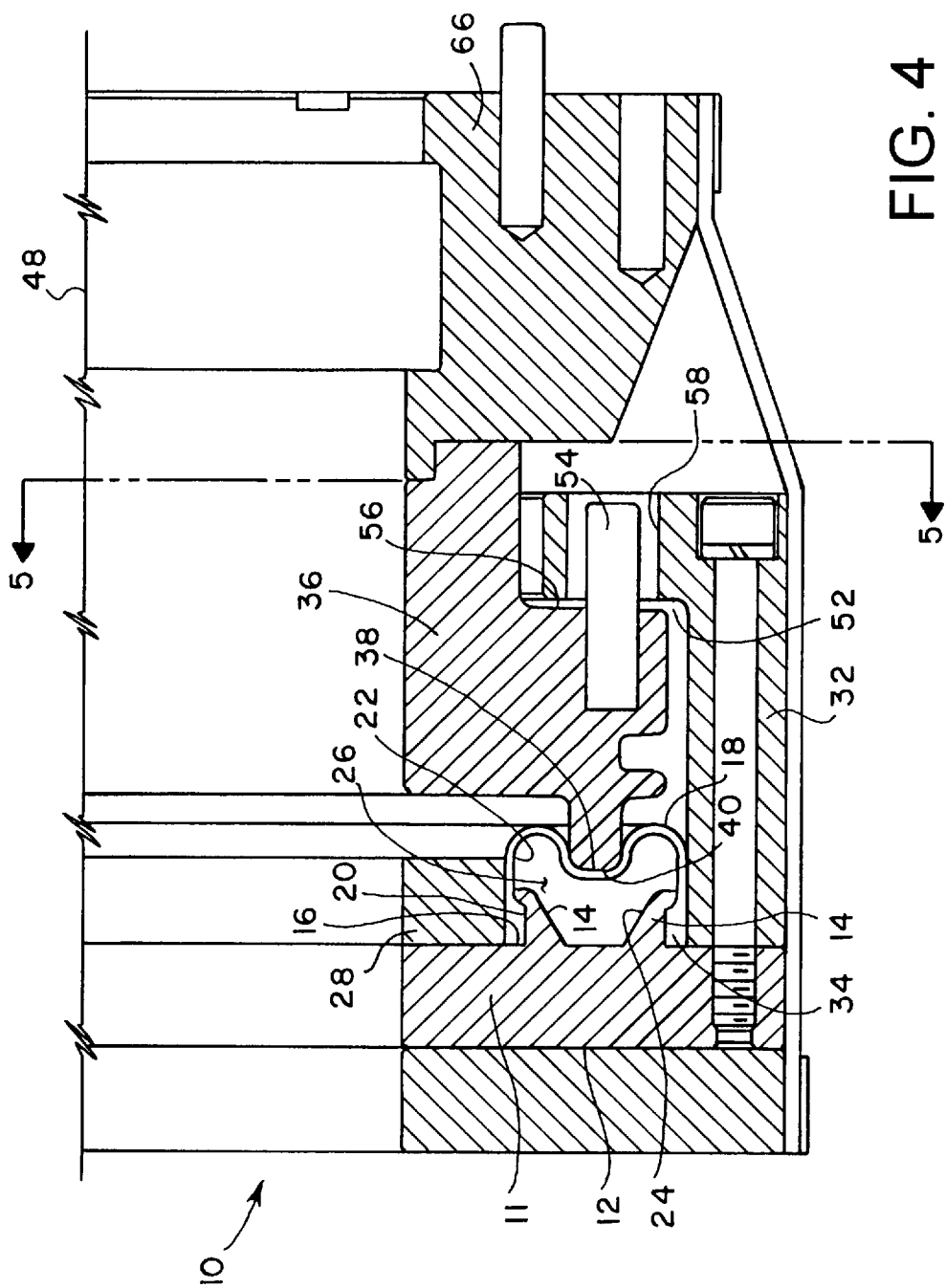
FIG. 4 is a sectional view taken along lines 4—4 of FIG. 2.
Figure 5:
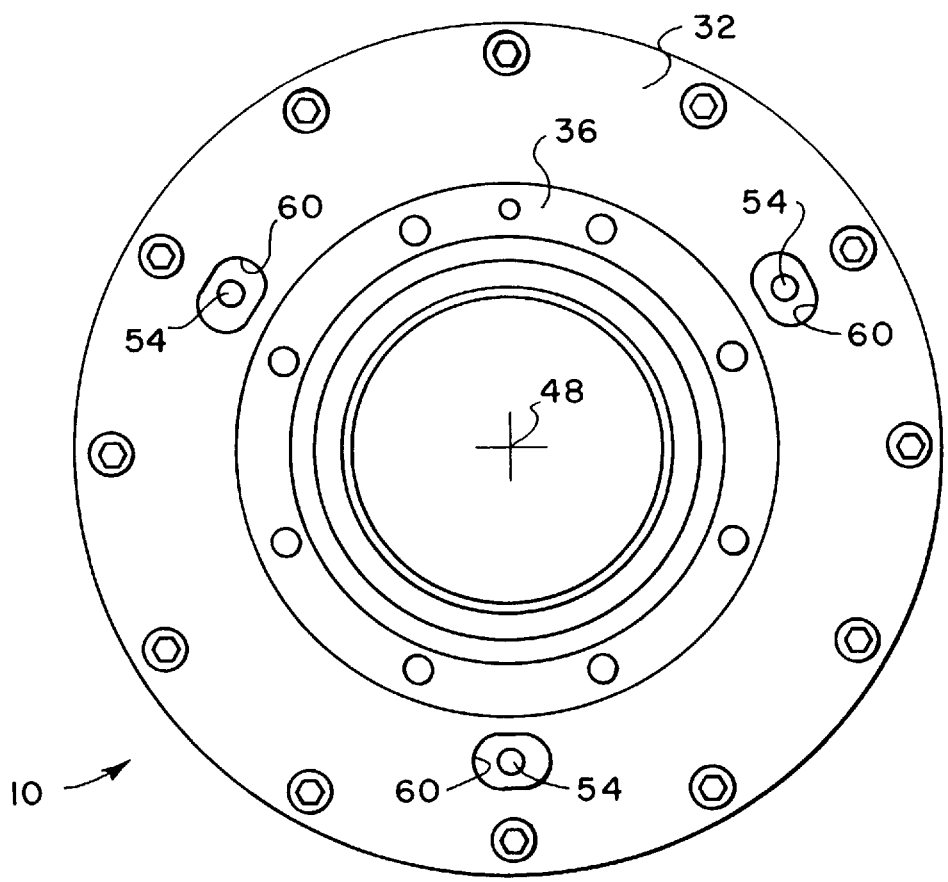
FIG. 5 is a sectional view taken along lines 5—5 of FIG. 4.

A plurality of spherical pins 46 are mounted in clutch plate 36, preferably about six in number and spaced equally about clutch plate 36 with respect to central axis 48. A plurality of spherical seats 50 corresponding to spherical pins 46 are provided on an inwardly-facing portion 52 of outer clamp ring 32 for establishing a normal position of the clutch assembly 10. A plurality of cylindrical pins 54 are parallel to but spaced apart from central axis 48, as best shown in FIG. 5. Pins 54 are preferably three number and spaced equally about clutch plate 36 with respect to central axis 48. Pins 54 are fixed to an outwardly-facing portion 56 of the clutch plate 36. Walls 58 (FIG. 4) form capsule-shaped holes 60 (FIG. 5) on the outer clamp ring 32 engaged with the cylindrical pins 54. The capsule-shaped holes 60 are widely-spaced from the pins 54 as best shown in FIGS. 4 and 5 to form physical limits of travel of the clutch plate 36 with respect to the outer clamp ring. Electrical switches 62 are attached to the clutch plate 36 and are positioned to detect movement of the clutch plate 36 away from the normal position. Preferably three switches 62 are provided having plungers 64 in contact with the inwardly-facing surface 52 of outer clamp ring 36.

A paint manifold mounting plate 66 is provided to mount the tool of choice to the clutch assembly 10. A resilient boot 68 may be provided to seal the unit from paint and other contaminants. The various parts of the clutch assembly 10 may be fastened together with screws, as shown in the Figures.

In operation, clutch assembly 10 is a breakaway clutch to provide the user with the ability to protect robot tooling, robots, and work pieces such as car bodies from damage while the robot cell is in operation. Assembly 10 is a safety mount that will automatically pivot and "E Stop" (emergency stop) the robot upon detection of an overload situation on the tool, such as a paint gun, attached to the assembly as described in prior patents referred to above.

The central passageway through the annular cross-sectioned device is preferably on the order of about 2.25 inches, which allows paint, pneumatic and electrical utility conduits to be run coaxially through the center of the robot arm to the tool.

The assembly has a variable sensitivity feature via chamber 26 and programmable air pressure to provide the user with the ability to make the assembly more sensitive when in areas of likely collision without sacrificing robot acceleration. Variable sensitivity is provided through the annular diaphragm 18 located internally to the device, but internal springs 44 provide rigidity when no air pressure is present. The user can vary the trip point by varying the air pressure on the assembly to increase payload capacity.

The six spherical pins and seats between the clutch plate and the outer clamp ring (connected to the diaphragm-mounting plate) provide a precise ±0.001 inch relocation after a collision. The cylindrical pins 54 in conjunction with the capsule-shaped holes 60 limit motion so that the six spherical pins and seats will relocate after a collision force has been removed.

Whereas, the present invention has been described with respect to specific embodiments thereof, it will be understood that various changes and modifications will be suggested to one skilled in the art, and it is intended to encompass such changes and modifications as fall within the scope of the appended claims.

I claim:

1. A clutch assembly for connecting a paint gun to the end of a robotic arm, comprising:

a diaphragm-mounting plate adapted to be connected on an outer side to the end of the robotic arm;

an annular diaphragm mounted to the diaphragm-mounting plate, the diaphragm having an inner surface, the inner surface forming a pressure tight chamber with the diaphragm-mounting plate for connection to a programmable source of air pressure;

a clutch plate having an annular diaphragm-engagement surface engaged with a central portion of the diaphragm;

springs between the clutch plate and the diaphragm-mounting plate to bias the clutch plate away from the diaphragm-mounting plate in conjunction with air pressure in the chamber;

means for establishing a normal position of the clutch assembly;

means for forming physical limits of travel of the clutch plate with respect to the diaphragm-mounting plate;

means for generating an electrical signal in response to movement of the clutch plate away from the normal position; and, with the diaphragm-mounting plate having inwardly-extending diaphragm-mounting walls on an inner side, and with inner portions of the diaphragm-mounting walls forming the chamber.

2. A clutch assembly for connecting a paint gun to the end of a robotic arm, comprising:

a diaphragm-mounting plate adapted to be connected on an outer side to the end of the robotic arm;

an annular diaphragm mounted to the diaphragm-mounting plate, the diaphragm having an inner surface, the inner surface forming a pressure tight chamber with the diaphragm-mounting plate for connection to a programmable source of air pressure;

a clutch plate having an annular diaphragm-engagement surface engaged with a central portion of the diaphragm;

springs between the clutch plate and the diaphragm-mounting plate to bias the clutch plate away from the diaphragm-mounting plate in conjunction with air pressure in the chamber;

means for establishing a normal position of the clutch assembly;

means for forming physical limits of travel of the clutch plate with respect to the diaphragm-mounting plate;

means for generating an electrical signal in response to movement of the clutch plate away from the normal position; and, with the means for forming physical limits of travel of the clutch plate with respect to the diaphragm-mounting plate including cylindrical pins parallel to but spaced apart from a central axis of the clutch assembly and fixed to an outwardly-facing portion of the clutch plate, and walls forming capsule-shaped holes on a surface connected to the diaphragm-mounting plate engaged with the cylindrical pins, the capsule-shaped holes being spaced from the pins.

3. A clutch assembly for connecting a paint gun to the end of a robotic arm, comprising:

a diaphragm-mounting plate adapted to be connected on an outer side to the end of the robotic arm and having inwardly-extending diaphragm-mounting walls on an inner side;

an annular diaphragm mounted over outer portions of the diaphragm-mounting walls, the diaphragm having an inner surface, the inner surface with inner portions of the diaphragm-mounting walls forming a pressure tight chamber with the diaphragm inner surface for connection to a programmable source of air pressure;

an inner clamp ring fixing an inner portion of the diaphragm to diaphragm-mounting walls;

an outer clamp ring fixing an outer portion of the diaphragm to the diaphragm-mounting walls, a clutch plate having an annular diaphragm-engagement surface engaged with a central portion of the diaphragm;

springs between the clutch plate and the diaphragm-mounting plate to bias the clutch plate away from the diaphragm-mounting plate in conjunction with air pressure in the chamber;

spherical pins on the clutch plate;

spherical seats on an inwardly-facing portion of the outer clamp ring engaged with the spherical pins for establishing a normal position of the clutch assembly;

cylindrical pins parallel to but spaced apart from a central axis of the clutch assembly and fixed to an outwardly-facing portion of the clutch plate;

walls forming capsule-shaped holes on the outer clamp ring engaged with the cylindrical pins, the capsule-shaped holes being spaced from the pins to form physical limits of travel of the clutch plate with respect to the outer clamp ring; and electrical switches attached to the clutch plate positioned to detect movement of the clutch plate away from the normal position.

* * * * *